United States Patent
Boland et al.

(10) Patent No.: US 8,549,696 B2
(45) Date of Patent: Oct. 8, 2013

(54) WINDSCREEN WIPER DEVICE

(75) Inventors: Xavier Boland, Arlon (BE); Pierre Henin, Bellefontaine (BE); Eric Coos, Aubange (BE)

(73) Assignee: Federal-Mogul S.A., Aubange (FR)

( * ) Notice: Subject to any disclaimer, the term of this patent is extended or adjusted under 35 U.S.C. 154(b) by 1408 days.

(21) Appl. No.: 10/590,753

(22) PCT Filed: Feb. 16, 2005

(86) PCT No.: PCT/EP2005/050676
§ 371 (c)(1),
(2), (4) Date: Nov. 12, 2008

(87) PCT Pub. No.: WO2005/082691
PCT Pub. Date: Sep. 9, 2005

(65) Prior Publication Data
US 2009/0064438 A1    Mar. 12, 2009

(30) Foreign Application Priority Data

Feb. 26, 2004 (EP) .................................. 04100758

(51) Int. Cl.
*B60S 1/40* (2006.01)
*B60S 1/38* (2006.01)

(52) U.S. Cl.
USPC .................................. 15/250.32; 15/250.351

(58) Field of Classification Search
USPC ........... 15/250.351, 250.32, 250.361, 250.43, 15/250.44, 250.201
See application file for complete search history.

(56) References Cited

U.S. PATENT DOCUMENTS

| | | | | |
|---|---|---|---|---|
| 2,757,403 A * | 8/1956 | Krohm | ........................ | 15/250.44 |
| 2,983,945 A * | 5/1961 | De Pew | ..................... | 15/250.452 |
| 6,599,051 B1 | 7/2003 | Jarasson | ........................ | 403/326 |
| 6,668,419 B1 | 12/2003 | Kotlarski | | |
| 7,690,074 B2 * | 4/2010 | Ostrowski | .................. | 15/250.32 |
| 7,716,780 B2 * | 5/2010 | Scholl et al. | ................ | 15/250.32 |
| 2002/0148064 A1* | 10/2002 | Dietrich et al. | ............. | 15/250.43 |
| 2006/0059647 A1 | 3/2006 | Ostrowski | | |

FOREIGN PATENT DOCUMENTS

| DE | 101 30 903 | 5/2002 |
|---|---|---|
| DE | 102 12 441 | 11/2003 |
| DE | 10212441 | 11/2003 |
| FR | 2759048 | 8/1998 |

(Continued)

OTHER PUBLICATIONS

Memento de Technologie Automobile, pp. 770-773, 3rd edition, Robert Bosch GmbH, 2004, Germany.

(Continued)

*Primary Examiner* — Gary Graham
(74) *Attorney, Agent, or Firm* — Robert L. Stearns; Dickinson Wright, PLLC

(57) ABSTRACT

A windscreen wiper device comprising an elastic, elongated carrier element, and an elongated wiper blade of a flexible material, and a connecting device for an oscillating arm, wherein the oscillating arm is pivotally connected to the connecting device about a pivot axis near one end, with the interposition of a joint part. The windscreen wiper device is provided with first and second retaining means for retaining the connecting device onto said oscillating arm. The first retaining means comprises at least one resilient tongue provided on the joint part engaging in a correspondingly shaped hole provided in the oscillating arm. The second retaining means comprises a least one first stop surface provided on the oscillating arm and at least one second stop surface provided on at least one of the joint part and connecting device.

16 Claims, 8 Drawing Sheets

(56) References Cited

FOREIGN PATENT DOCUMENTS

| FR | 2788027 | 7/2000 |
|----|---------|--------|
| WO | 0204594 | 5/2002 |
| WO | 0240328 | 5/2002 |
| WO | 02053421 | 7/2002 |
| WO | 2004098962 | 11/2004 |
| WO | 2005039944 | 5/2005 |

OTHER PUBLICATIONS

Kraftfahr-technisches Taschenbuch, pp. 844-847, 24th edition, Robert Bosch GmbH, Apr. 2002, Germany.

Le Hen et al., Wiping V 70 MRA Wiping Training Manual, Technical brochure Valeo Team Garage, pp. 19-25, Valeo Distribution D.N.A. Acheve d'imprimer sur les presses de l'imprimmerie BOUDIN 30, rue Etienne DOLET—94230 CACHAN ISSN (1245-1290) Jul. 1994.

BMW Series 5 Photos printed Mar. 20, 2008.

BMW Série 5, Wikipedia, http://fr.wikipedia.org/wiki/BMW_sACrie_5, pp. 1-7, Mar. 20, 2008.

European Patent Office, Interlocutory decision in Opposition proceedings, EP1568559, May 10, 2010.

* cited by examiner

WINDSCREEN WIPER DEVICE

CROSS REFERENCE TO RELATED APPLICATIONS INCLUDING THE PRIORITY CLAIM

This patent application claims priority to PCT/EP2005/050676, having an international filing date of Feb. 16, 2005 which claims priority to EP 04100758.4 filed on Feb. 26, 2004, each of which is incorporated herein by reference it its entirety.

BACKGROUND OF THE INVENTION

1. Field of the Invention

The present invention relates generally to a windscreen wiper device. More particularly, the present invention relates to a windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighbouring ends of said longitudinal strips are interconnected by a respective connecting piece, which windscreen wiper device comprises a connecting device for an oscillating arm, wherein said oscillating arm is pivotally connected to said connecting device about a pivot axis near one end, with the interposition of a joint part.

2. Related Art

Such a windscreen wiper device is known from German patent publication no. 101 30 903 (Robert Bosch GmbH). This prior art windscreen wiper device is designed as a "yokeless" wiper device, wherein no use is made of several yokes' pivotally connected to each other, but wherein the wiper blade is biased by the carrier element, as a result of which it exhibits a specific curvature. This known device has a first coupling half fixed to the oscillating arm, as well as a second coupling half fixed to the wiper blade, wherein two parallel interspaced supporting walls of the second coupling half are oriented. in the longitudinal direction of the wiper blade. Each end of a pivot pin for a joint part, which is mounted on the pivot pin in a manner that permits it to swing between the supporting walls and which is provided for connecting the oscillating arm, is held in these supporting walls. In order to obtain protection against environmental influences such as snow, ice and dust, the oscillating arm is u-shaped in the area of its coupling half, whereby the U-base covers the supporting (protective) walls and both U-limbs cover the outer sides of these supporting walls.

A disadvantage of the windscreen wiper device known from the above-mentioned German patent document is that, due to high forces exerted in practice on the connection between the connecting device and the oscillating arm, the reliability of said connection appears to diminish with the passage of time, resulting in play between the connecting device and the oscillating arm. Such a play in practice has proven to lead to frictional contact between these parts and therefore to wear. A further disadvantage thereof is that many constructional parts are involved in the connection between the connecting device and the oscillating arm, making the known windscreen wiper device laborious to manufacture and therefore relatively costly.

SUMMARY OF THE INVENTION

The object of the invention is to overcome these drawbacks of the prior art as indicated above, in particular to provide a windscreen wiper device wherein the connecting device and the oscillating arm are interconnected in a simple though durable and solid manner.

In order to accomplish that objective, a windscreen wiper device of the type referred to in the introduction is characterized according to the invention in that the windscreen wiper device is provided with first and second retaining means for retaining said connecting device onto said oscillating arm, said first retaining means comprising at least one resilient tongue provided on said joint part engaging in a correspondingly shaped hole provided in said oscillating arm, said second retaining means comprising at least one first stop surface provided on the oscillating arm and at least one second stop surface provided on the joint part or the connecting device, both first and second stop surfaces being spaced apart during normal operation of the windscreen wiper device, wherein in case of disfunctioning of said first retaining means said connecting device is allowed to move with respect to said oscillating arm causing the second stop surface to correspondingly move towards the first stop surface until the first and second stop surfaces are adjacent one another. In other words, in rest position the stop surfaces of the second retaining means are spaced apart, whereas in working position they are adjacent to each other.

Preferably, the oscillating arm has an at least substantially U-shaped cross-section at the location of its connection to said joint part, wherein said hole is provided in a base of said U-shaped cross-section. Instead or in addition thereto, said joint part preferably comprises at least two lateral resilient tongues extending outwardly, wherein the oscillating arm has an at least substantially U-shaped cross-section at the location of its connection to said joint part, and wherein each tongue engages in a correspondingly shaped hole provided in a leg of said U-shaped cross-section. While mounting the oscillating arm onto the connecting device/joint part, the resilient tongue(s) is/are initially pushed in against a spring force and then allowed to spring back into said hole(s), thus snapping, that is clipping the resilient tongue(s) into the hole(s). In case these first retaining means would fail in actual practice, for example when the resilient tongue (s) are not properly snapped into the hole (s), the second retaining means serve to hold the connecting device onto the oscillating arm after all and thus to avoid any undesired separation thereof, with all negative consequences involved, such as lost loss of the wiper blade. In the event that the first retaining means would break down, the wiper blade and the connecting device attached thereto may move relative to the oscillating arm. As will be explained more in detail below, such a movement takes place in a longitudinal direction of the wiper blade, causing the second stop surface (provided on the joint part or the connecting device) to move towards the first stop surface (provided on the oscillating arm) in a similar way. However, said relative movement of the wiper blade and the oscillating arm and thus said relative movement of both stop surfaces are blocked when the second stop surface reaches the first stop surface and is stopped by the first stop surface.

In one preferred embodiment of a windscreen wiper device in accordance with the invention said hole(s) has/have a closed circumference. Such (a) closed hole(s) enhance(s) the retention of the oscillating arm onto the connecting device/joint part in all directions, particularly both horizontally and vertically.

In another preferred embodiment of a windscreen wiper device according to the invention the oscillating arm has an at least substantially U-shaped cross-section at the location of its connection to said joint part, and wherein each leg comprises clamping members which engage found longitudinal sides of said joint part that face away from each other. These clamping members being preferably formed as inwardly bended edges integral with the legs of the U-shaped cross-section, serve to further enhance the retention of the oscillating arm onto the connecting device/joint part in vertical direction, that is perpendicular to the longitudinal direction of the oscillating arm.

In another preferred embodiment of a windscreen wiper device in accordance with the invention the second stop surface is caused to correspondingly move towards the first stop surface in longitudinal direction of the wiper blade. Again, such a longitudinal relative movement of both stop surfaces will be eventually blocked when said movement of the second stop surface is stopped by the first stop surface, resulting in a retention in longitudinal (horizontal) direction as well.

In another preferred embodiment of a windscreen wiper device according to the invention the oscillating arm has an at least substantially U-shaped cross-section at the location of its connection to said joint part, wherein said first stop surface is provided on a leg of said U-shaped cross-section. The first stop surface is particularly formed by a hook-shaped protrusion extending downwardly.

In another preferred embodiment of a windscreen wiper device in accordance with the invention said joint part has an at least substantially U-shaped cross-section at the location of its attachment to said connecting device, wherein said second stop surface is provided on a leg of said U-shaped cross-section. Preferably, the second stop surface is formed by a hook-shaped protrusion extending upwardly.

In another preferred embodiment of a windscreen wiper device according to the invention the first stop surface is formed by a transverse pin extending inwardly. In particular, the second stop surface is formed by a guiding groove in the connecting device. The guiding groove guides the transverse pin in or out the "locked" position of the oscillating arm onto the connecting device.

In another preferred embodiment of a windscreen wiper device in accordance with the invention said connecting device is positioned at least substantially within said joint part. Particularly, this enables to attach said joint part to said connecting device by protrusions of said connecting device at the location of said pivot axis, said protrusions pivotally engaging in recesses provided in said joint part. These protrusions that function as bearing surfaces are spaced far apart, so that the forces exerted on the bearing surfaces will be relatively low. As these protrusions replace the pivot pin as used in the known windscreen wiper device discussed above, less constructional components are used in connecting the connection device and the oscillating arm together. Of course, in the alternative the joint part is equipped with protrusions at the location of said pivot axis, said protrusions of the joint part pivotally engaging in recesses provided in the connecting device.

In another preferred embodiment of a windscreen wiper device according to the invention said joint part has an at least substantially U-shaped cross-section at the location of its attachment to said connecting device, wherein said joint part in each leg of said U-shaped cross-section is provided with a recess provided coaxially with said pivot axis. Preferably, the protrusions extend outwards on either side of said connecting device (that is, outwardly in lateral direction with respect to the oscillating arm), wherein the protrusions are at least substantially cylindrical. Particularly, the recesses are correspondingly shaped.

In another preferred embodiment of a windscreen wiper device in accordance with the invention said joint part is made of plastic, which includes any synthetic material having some flexibility.

In another preferred embodiment of a windscreen wiper device according to the invention the oscillating arm, the connecting device and the joint part are each made in one piece.

BRIEF DESCRIPTION OF THE DRAWINGS

The invention will now be explained in more detail with reference to figures illustrated in a drawing, wherein.

DETAILED DESCRIPTION OF THE PREFERRED EMBODIMENT

Figure 1:
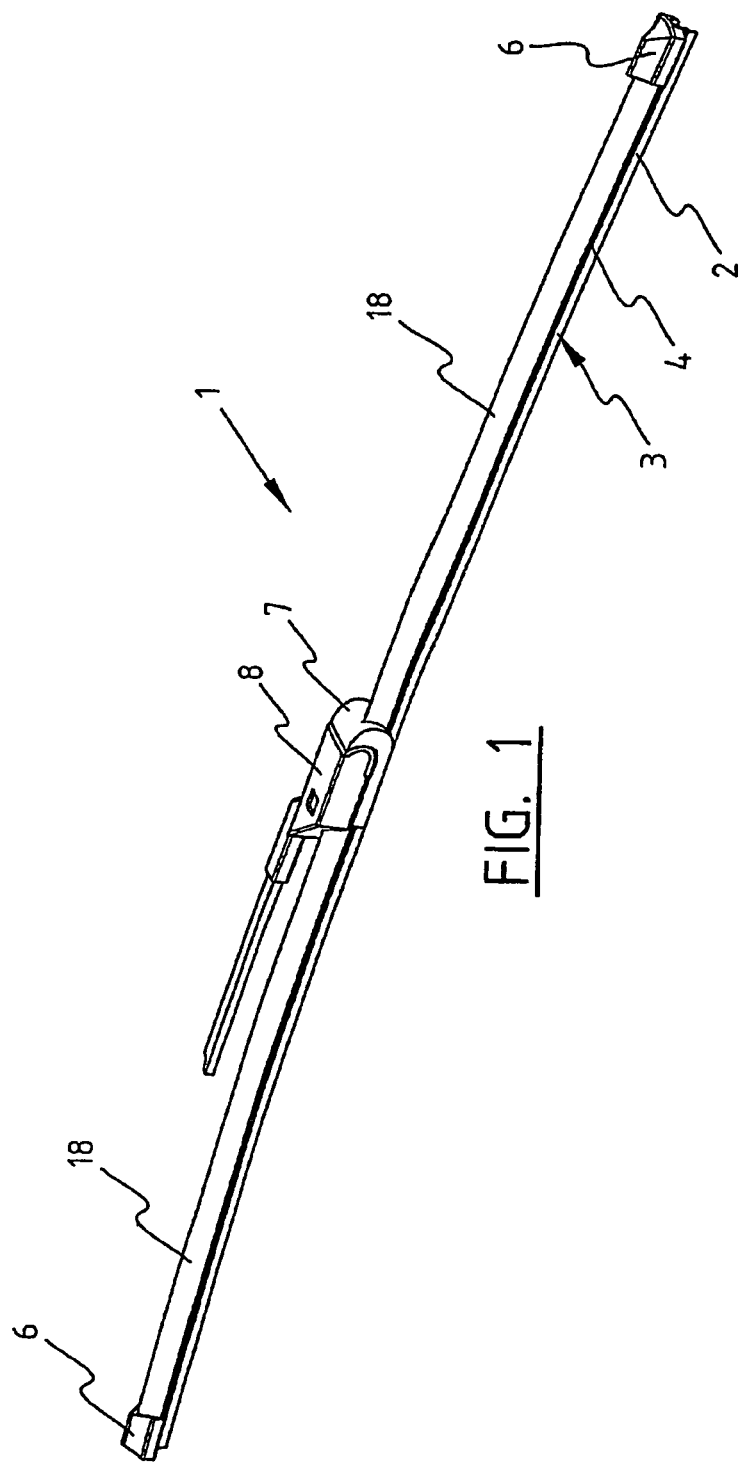
FIG. 1 is a perspective, schematic view of a windscreen device of the "yokeless" type in accordance with the invention.

FIG. 1 shows a windscreen wiper device 1 of the "yokeless" type according to the invention. Said windscreen wiper device is built up of an elastomeric wiper blade 2, in the longitudinal sides of which opposing longitudinal grooves 3 are formed, and of longitudinal strips 4 made of spring band steel, which are fitted in said longitudinal grooves 3. Said strips 4 form a flexible carrier element for the rubber wiper blade 2, as it were, which is thus biased in a curved position (the curvature in operative position being that of a windscreen to be wiped). Neighbouring ends of strips 4 are interconnected on either side of the windscreen wiper device 1 by means of connecting pieces 6 functioning as clamping members. In this embodiment, the connecting pieces 6 are separate constructional elements, which may be form-locked ("positive locking" or "having positive fit") as well as force-locked to the ends of strips 4. In another preferred variant, said connecting pieces 6 are in one piece with the strips 4 made of spring band steel. In the latter case said connecting pieces form transverse bridges for the strips 4, as it were.

The windscreen wiper device 1 is furthermore built up of a connecting device 7 of plastic material for an oscillating wiper arm 8. Connecting device 7 comprises clamping members that are integral therewith, which engage round longitudinal sides of the strips 4 that face away from each other, as a result of which the connecting device 7 is firmly attached to the unit consisting of wiper blade 2 and strips 4. The oscillating wiper arm 8 is pivotally connected to the connecting device 7 about a pivot axis 30 near one end, and that in the following manner.

Figure 2A:
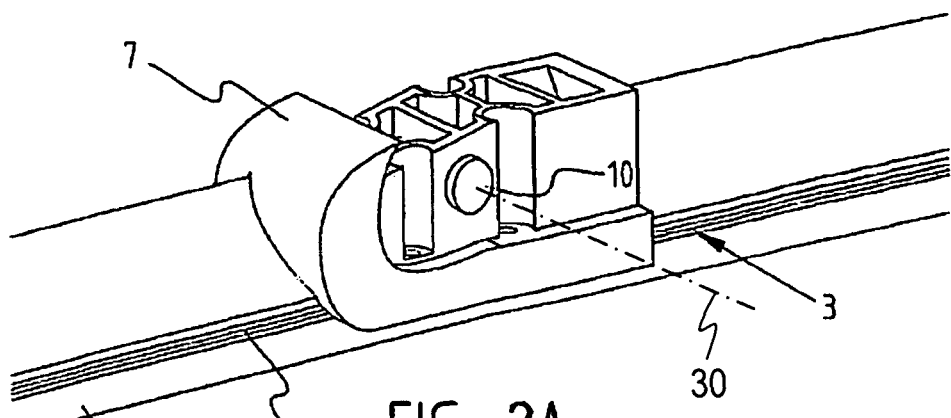
FIGS. 2 and 3 show details of the windscreen wiper device of FIG. 1, wherein various successive steps are shown for fitting an oscillating wiper arm to a connecting device using two different types of joint parts ("spacers"), particularly illustrating the first retaining means.
Figure 2B:
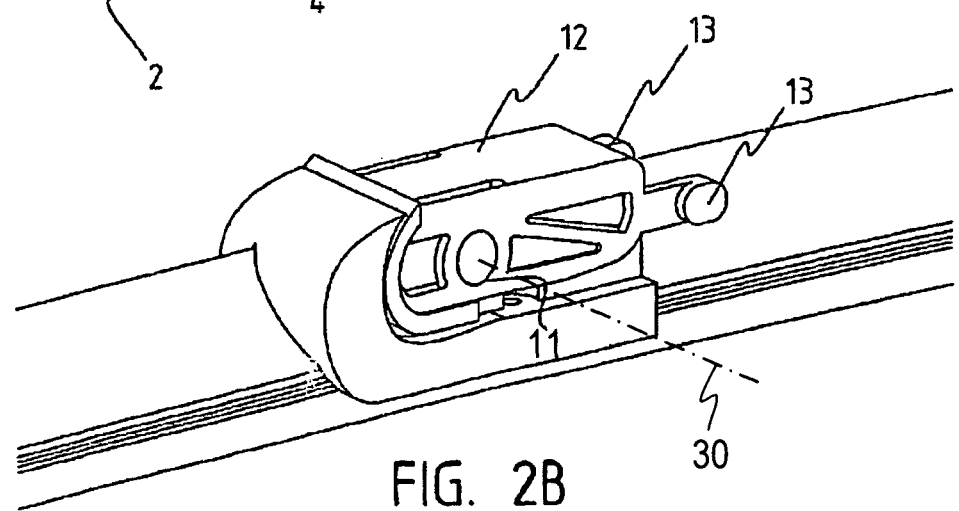
Figure 2C:
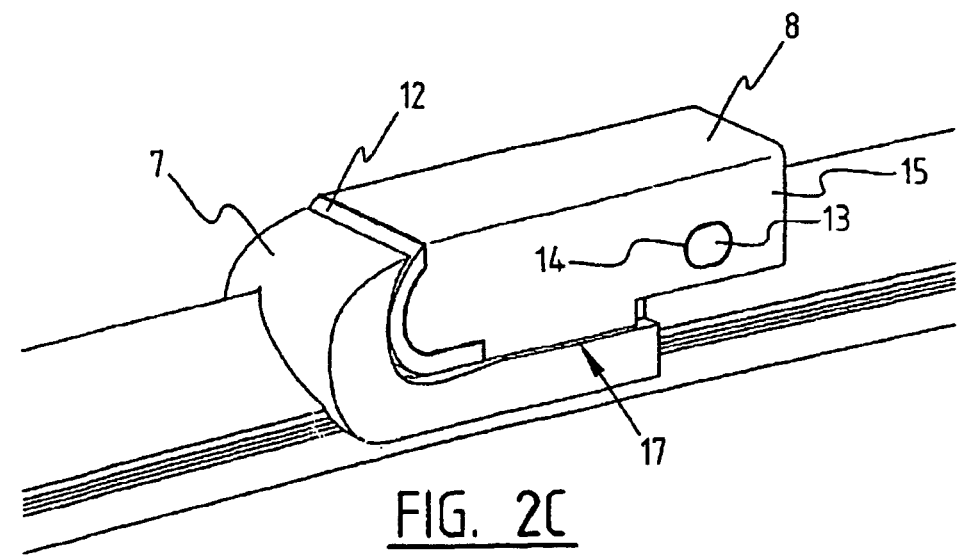

With reference to FIG. 2 the connecting device 7 comprises two cylindrical protrusions 10 extending outwards on either side of said connecting device 7 (FIG. 2a). These protrusions 10 pivotally engage in identically shaped cylindrical recesses 11 of a plastic joint part 12 (FIG. 2b). Said protrusions 10 act as bearing surfaces at the location of a pivot axis 30 in order to pivot the joint part 12 (and the oscillating wiper arm 8 attached thereto) about said pivot axis 30 near one end of said arm 8. The protrusions 10 are preferably in one piece with the connecting device 7; in the alternative, the protrusions 10 are part of a single pivot pin perpendicular to the connecting device 7. Said connecting device 7 may be equipped with a cover or cap in order to obtain an aesthetic appearance thereof, to avoid sharp edges and to provide protection against UV-light etcetera. The joint part 12 comprises two lateral resilient tongues 13 extending outwardly, while the oscillating arm 8 has a U-shaped cross-section at the location of its connection to said joint part 14, so that each tongue 13 engages in an identically shaped hole 14 provided in a leg 15 of said U-shaped cross-section (FIG. 2c).

Figure 3A:
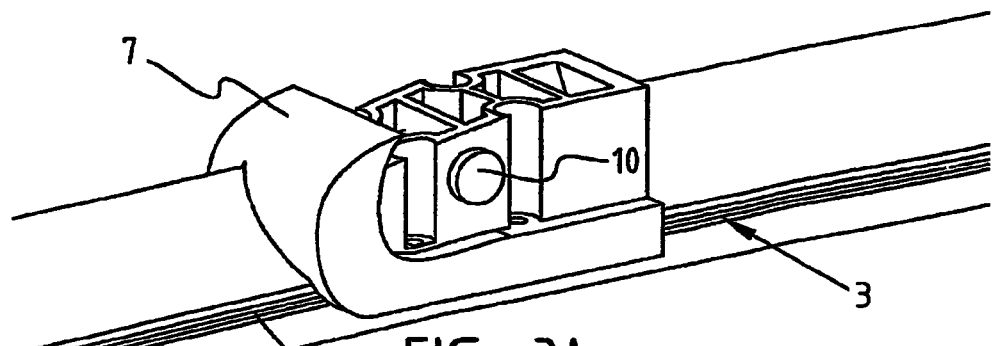
Figure 3B:
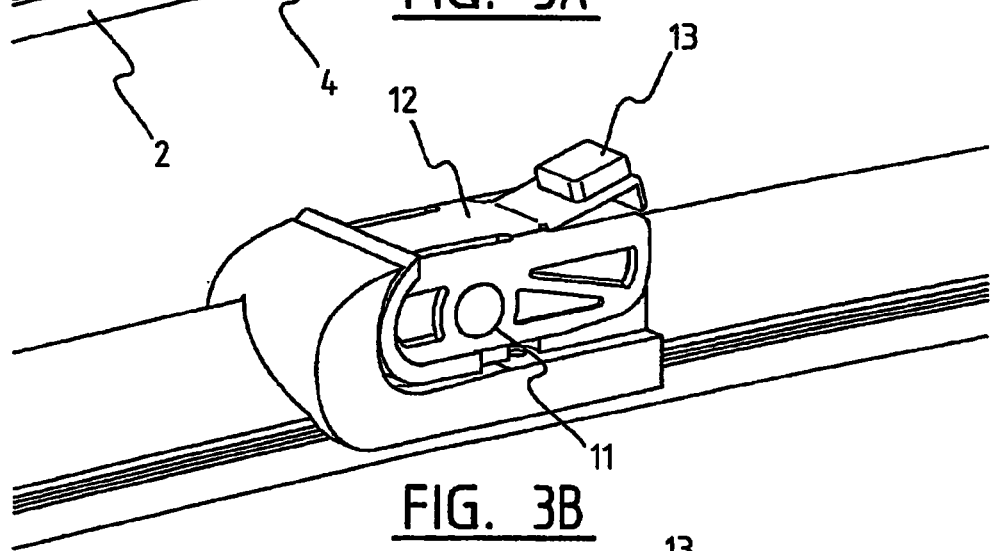
Figure 3C:
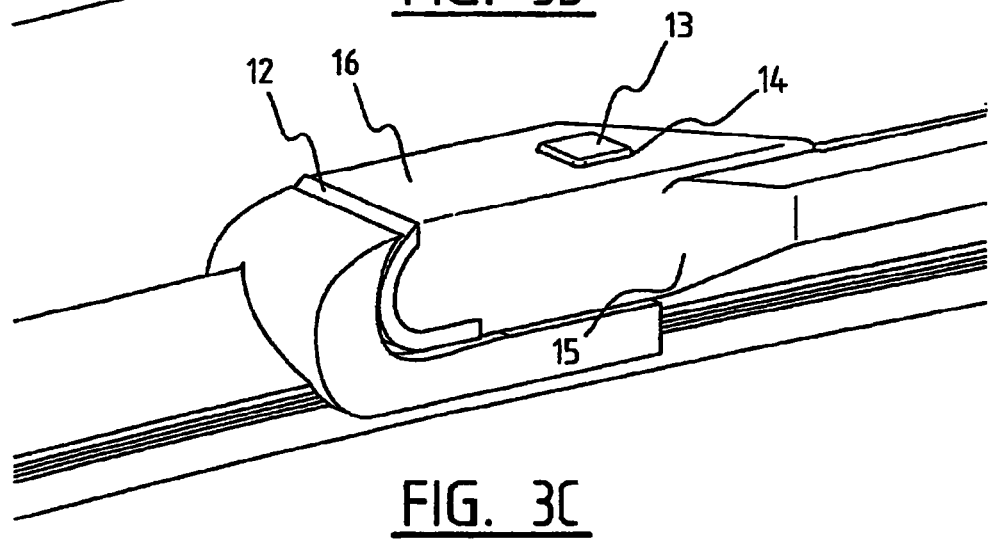

FIGS. 3a, 3b and 3c correspond to FIGS. 2a, 2b and 2c, respectively; with the difference that one resilient tongue 13 in FIG. 3 fits in a hole 14 provided in a base 16 of the U-shaped cross-section (FIG. 3c).

Referring to both FIGS. 2 and 3, while mounting the oscillating wiper arm 8 onto the connecting device 7/joint part 12, the resilient tongue(s) 13 is/are initially pushed in against a spring force and then allowed to spring back into said hole(s) 14, thus snapping, that is clipping the resilient tongue(s) 13 into the hole(s) 14. This is a so-called bayonet-connection.

Figure 4:
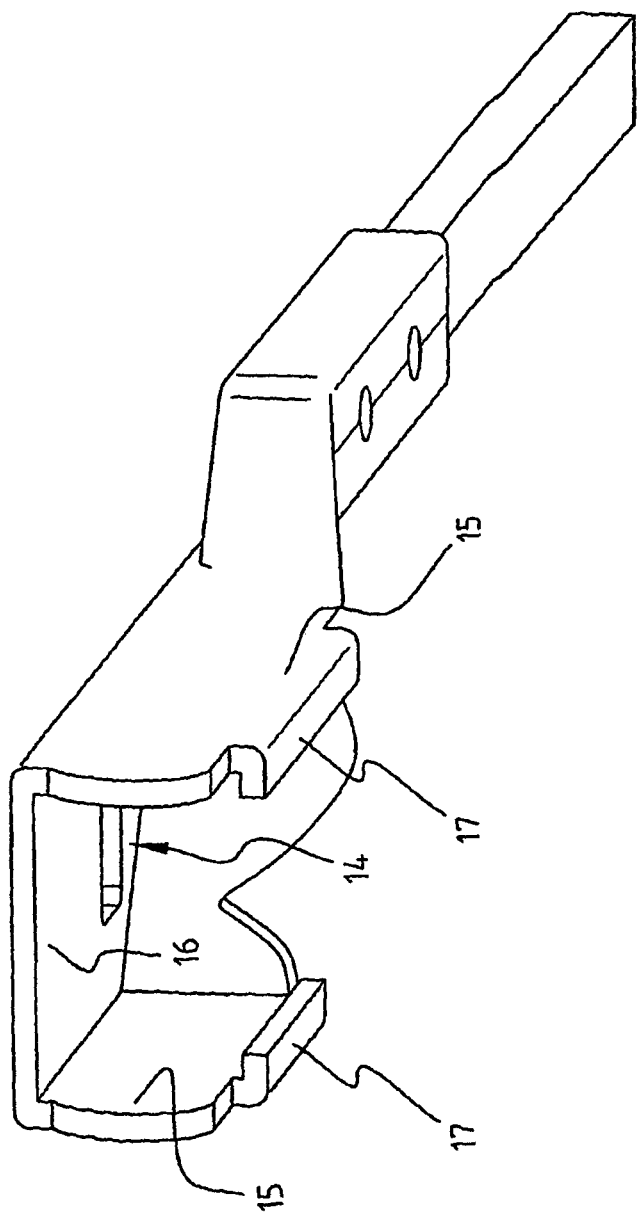
FIG. 4 is a perspective and schematic view of an end of an oscillating wiper arm used in FIG. 3.

Each leg 15 of the U-shaped cross-section comprises clamping members which engage round longitudinal sides of said joint part 12 that face away from each other. In FIGS. 2,3 and 4 these clamping members are formed as inwardly bended edges 17 integral with the legs 15 of the U-shaped cross-section, serving to further enhance the retention of the oscillating arm 8 onto the connecting device 7/joint part 12 in vertical direction, that is perpendicular to the longitudinal direction of the oscillating wiper arm 8.

Figure 5A:
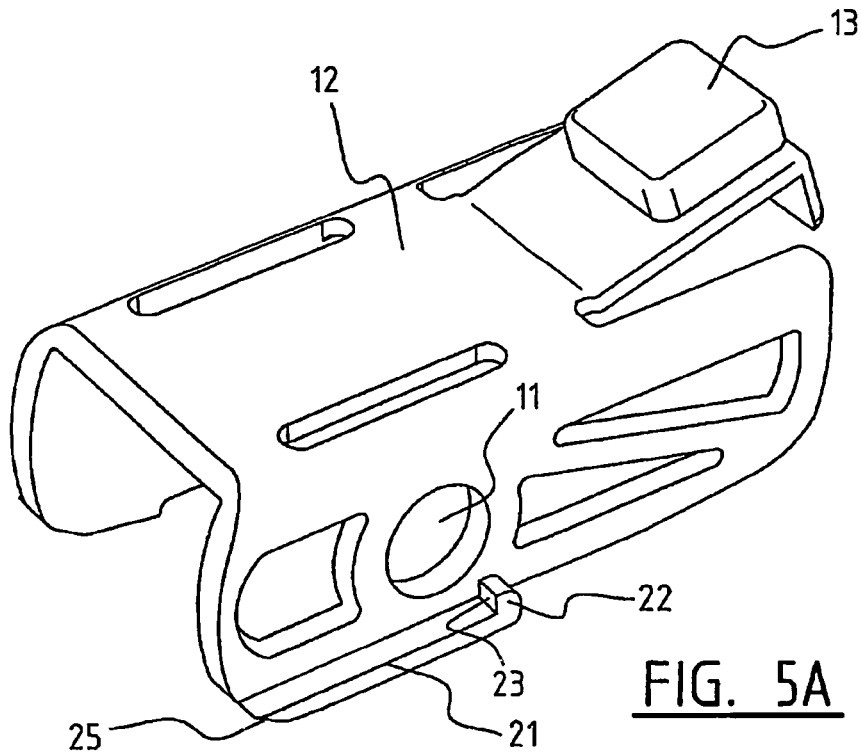
FIGS. 5 and 6 show details of the windscreen wiper device of FIG. 1, particularly illustrating a first embodiment of the second retaining means.
Figure 5B:
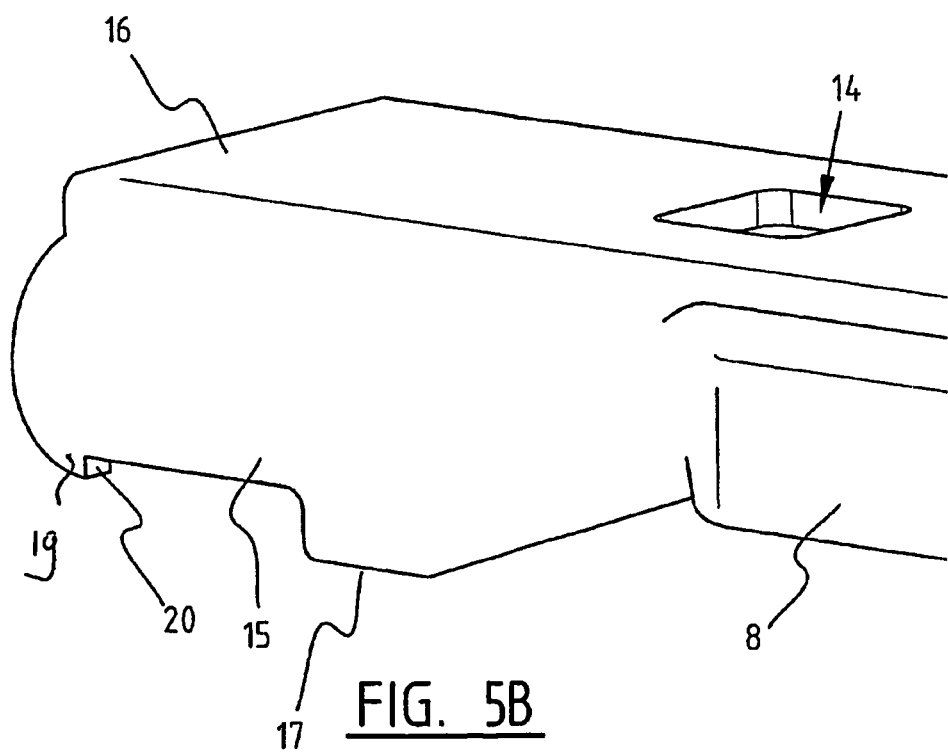

With reference to FIG. 5, each leg 15 of the U-shaped cross-section is provided with a first stop surface 19 formed by a downwardly extending protrusion in the form of a hook 20, as can be seen in FIG. 5b. The legs of the U-shaped cross-section of the joint part 12 each comprise a laterally extending edge 21 equipped with an upwardly extending protrusion in the form of a hook 22, wherein said hook 22 forms a second stop surface 23 provided on the joint part 12 (see FIG. 5a).

Figure 6A:
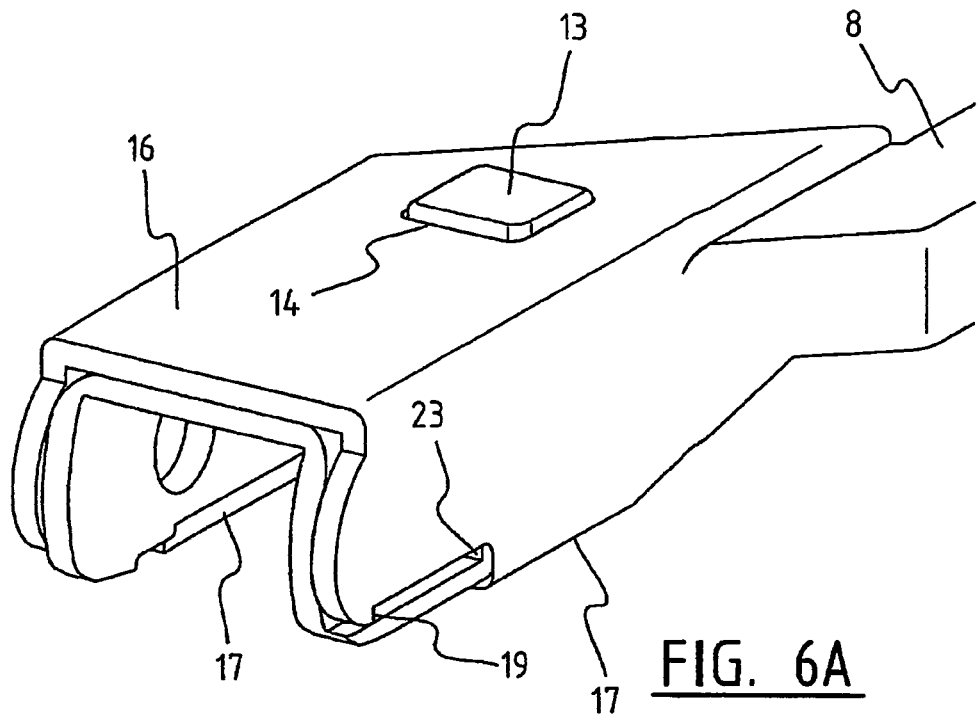
Figure 6B:
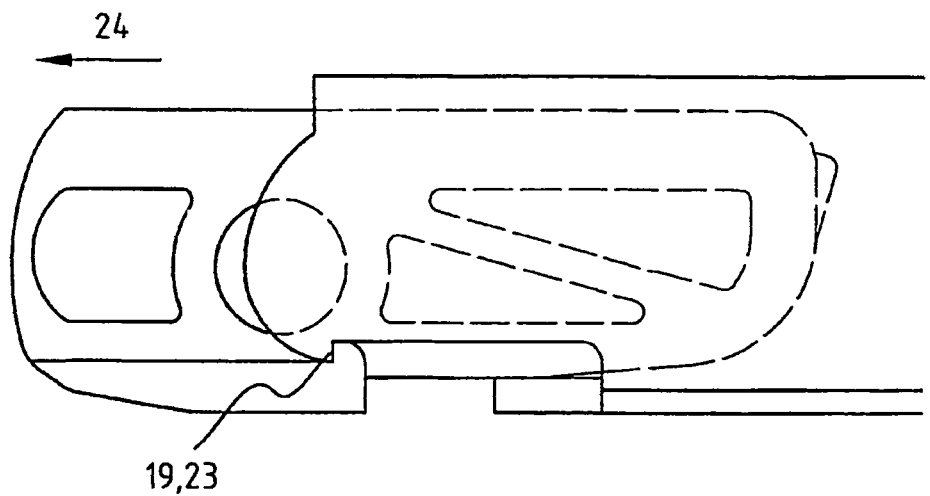

In an assembled position (FIG. 6a) both stop surfaces 19,23 are located at a distance from each other. However, in case the first retaining means would disfunction, for example when the resilient tongue 13 would not properly fit into the hole 14, the connecting device 7 and the joint part 12 attached thereto would be able to move relative to the oscillating arm 8 in a longitudinal direction of the wiper blade 2, that is in the direction of the arrow 24 (FIG. 6b). Simultaneously, the second stop surface 23 will move in the same direction until it is stopped by the first stop surface 19. Both stop surfaces 19,23 will then be adjacent to each other (FIG. 6b). In other words, the mutually cooperating stop surfaces 19,23 function as second retaining means for retaining the connecting device 7 onto the oscillating arm 8.

Figure 7A:
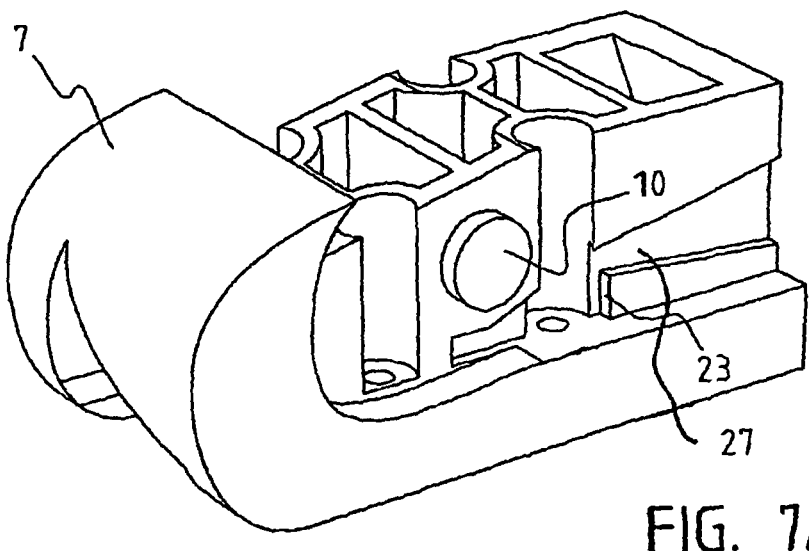
FIG. 7 is a perspective and schematic view of a connecting device and an end of an oscillating wiper arm, particularly illustrating a second embodiment of the second retaining means.
Figure 7B:
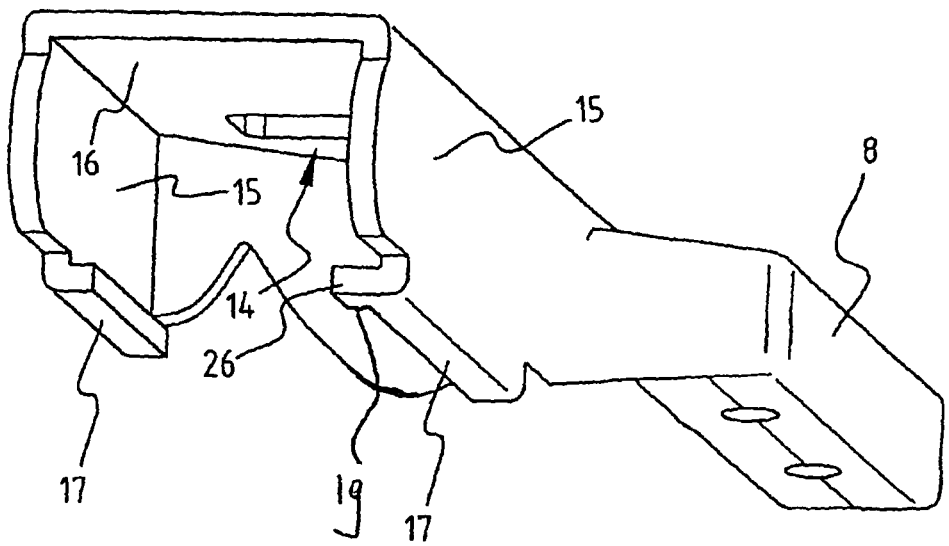

FIGS. 7a and 7b refer to another embodiment of the second retaining means. In this case, the first stop surface 19 is formed by an inwardly extending transverse pin 26, whereas the second stop surface 23 is formed by a correspondingly shaped guiding groove 27 in the connecting device 7. The guiding groove 27 serves to guide the pin 26 in mounted position onto the connecting device 7. Again, in case the first retaining means would fail, the connecting device 7 and the joint part 12 attached thereto would be able to move relative to the oscillating arm 8 in longitudinal direction of the wiper blade 2. Again, the second stop surface 23 will move in the same direction until it is stopped by the first stop surface 19 formed by the inwardly extending pin 26. Both stop surfaces 19,23 will then be adjacent to each other. The mutually cooperating stop surfaces 19 (formed by the inwardly extending transverse pin 26), 23 (formed by the groove 27 in the connecting device 7) function as second retaining means for retaining the connecting device 7 onto the oscillating arm 8.

Figure 8A:
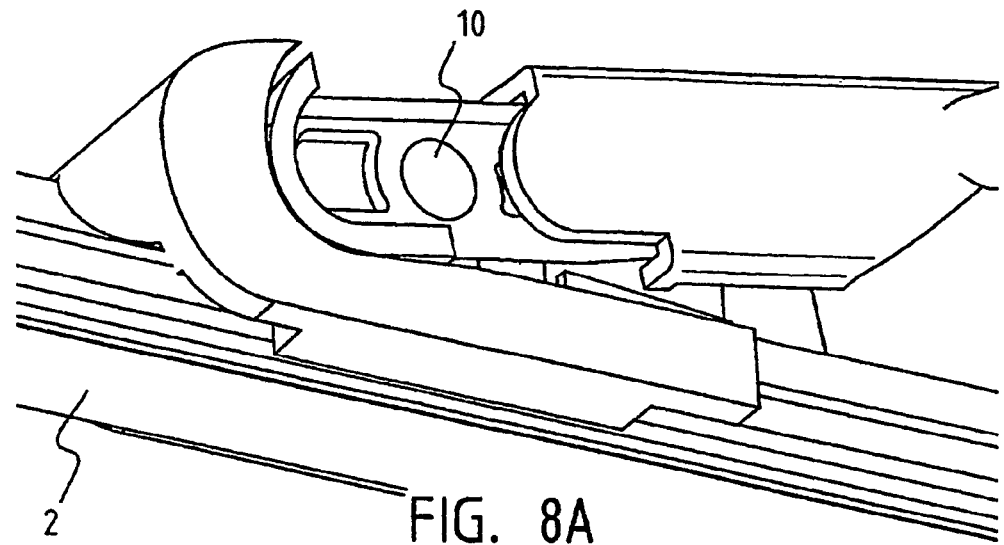
FIG. 8 shows several steps in (dis) mounting the connecting device and the oscillating wiper arm of FIG. 7.
Figure 8B:
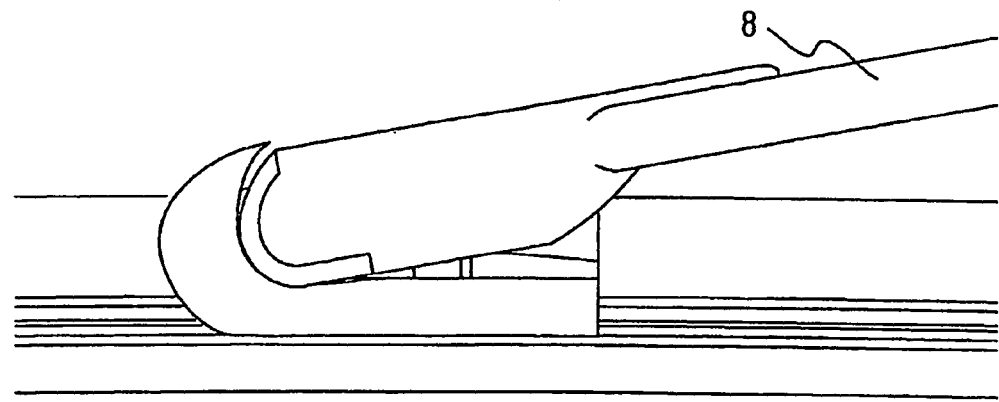
Figure 8C:
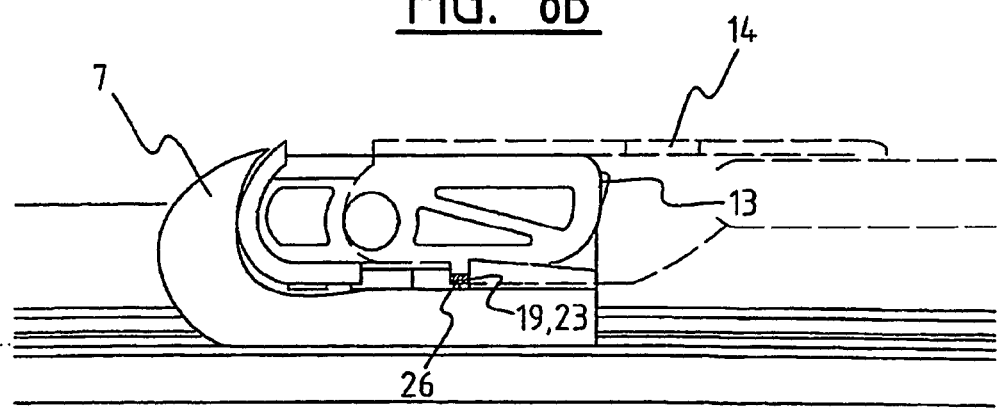

FIG. 8 shows the steps of mounting or dismounting the connecting device onto or from the oscillating arm 8. While carrying out a pivoting movement of the connecting device 7 and the joint part 8 attached thereto relative to the oscillating arm 8 (or vice versa) the stop surfaces 19,23 are no longer in line and cannot mutually cooperate any longer, so that the connecting device 7 and the joint part 12 attached thereto can be released from the oscillating arm 8 (FIGS. 8a and 8b). FIG. 8c refers to the normal "locked" position. Possibly, a spoiler 18 is furthermore provided (FIG. 1).

The invention is not restricted to the variants shown in the drawing, but it also extends to other embodiments that fall within the scope of the appended claims.

The invention claimed is:

1. A windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of said carrier element are disposed, wherein neighbouring ends of said longitudinal strips are interconnected by a respective connecting piece, which windscreen wiper device comprises a connecting device for an oscillating arm, wherein said oscillating arm is pivotally connected to said connecting device about a pivot axis near one end, with the interposition of a joint part, said windscreen wiper device is provided with first and second retaining means for retaining said connecting device onto said oscillating arm, said first retaining means comprising at least one resilient tongue provided on said joint part engaging in at least one correspondingly shaped hole provided in said oscillating arm, said second retaining means comprising at least one first stop surface provided on said oscillating arm and at least one second stop surface provided on at least one of said joint part and said connecting device, both first and second stop surfaces being spaced apart during normal operation of said windscreen wiper device, wherein in case of disfunctioning of said first retaining means said connecting device is allowed to move with respect to said oscillating arm causing said second stop surface to correspondingly move towards said first stop surface until said first and second stop surfaces are adjacent one another, wherein said second stop surface is operative to move towards said first stop surface in a longitudinal direction of said wiper blade towards the free end of said oscillation arm, wherein said oscillating arm has an at least substantially U-shaped cross-section at the location of its connection to said joint part, wherein said first stop surface is provided on a leg of said U-shaped cross-section, wherein said first stop surface is formed by a transverse pin extending inwardly, and wherein each leg comprises clamping members formed as inwardly bended edges integral with said legs of said U-shaped cross-section and engaging round longitudinal sides of said joint part that face away from each other and serving to further enhance the retention of said oscillating arm onto said connecting device and joint part in a vertical direction.

2. A windscreen wiper device according to claim 1, wherein said second stop surface is provided on said joint part.

3. A windscreen wiper device according to claim 1, wherein said second stop surface is provided on said connecting device.

4. A windscreen wiper device according to claim 1, wherein said oscillating arm has an at least substantially U-shaped cross-section at the location of its connection to said joint part, and wherein said hole is provided in a base of said U-shaped cross-section.

5. A windscreen wiper device according to claim 1, wherein said joint part comprises at least two lateral resilient tongues extending outwardly, wherein the oscillating arm has an at least substantially U-shaped cross-section with at least two legs at the location of its connection to said joint part, and wherein each tongue engages in a correspondingly shaped hole provided in a respective ones of said legs of said U-shaped cross-section.

6. A windscreen wiper device according to claim 1, wherein said hole has a closed circumference.

7. A windscreen wiper device according to claim 1, wherein said first stop surface is formed by a hook-shaped protrusion extending downwardly.

8. A windscreen wiper device according to claim 1 wherein said joint part has an at least substantially U-shaped cross-section at the location of its attachment to said connecting device, and wherein said second stop surface is provided on a leg of said U-shaped cross-section.

9. A windscreen wiper device according to claim 8, wherein said second stop surface is formed by a hook-shaped protrusion extending upwardly.

10. A windscreen wiper device according to claim 1, wherein said second stop surface is formed by a guiding groove in said connecting device.

11. A windscreen wiper device according to claim 1, wherein said connecting device is positioned at least substantially within said joint part.

12. A windscreen wiper device according to claim 11, wherein said joint part is attached to said connecting device by pivotally engaging protrusions of said connecting device at the location of said pivot axis in recesses provided in said joint part.

13. A windscreen wiper device according to claim 12, wherein said joint part has an at least substantially U-shaped cross-section at the location of its attachment to said connecting device having two legs, and wherein said joint part in each leg of said U-shaped cross-section is provided with a recess provided coaxially with said pivot axis.

14. A windscreen wiper device according to claim 12, wherein said protrusions extend outwards on either side of said connecting device and wherein said protrusions are at least substantially cylindrical.

15. A windscreen wiper device according to claim 11, wherein said joint part is made of plastic.

16. A windscreen wiper device according to claim 1, wherein said oscillating arm, said connecting device and said joint part are each made in one piece.

* * * * *